XR 2,506,672

May 9, 1950 R. D. KELL ET AL 2,506,672

SIGNAL TRANSMISSION SYSTEM

Filed Oct. 31, 1945 2 Sheets-Sheet 1

INVENTORS
RAY D. KELL.
GEORGE C. SZIKLAI.
BY
ATTORNEY

SIGNAL TRANSMISSION SYSTEM

Filed Oct. 31, 1945 2 Sheets-Sheet 2

INVENTORS
RAY D. KELL.
GEORGE C. SZIKLAI.
BY H. S. Grover
ATTORNEY

Patented May 9, 1950 2,506,672

UNITED STATES PATENT OFFICE 2,506,672

SIGNAL TRANSMISSION SYSTEM

Ray D. Kell and George C. Sziklai, Princeton, N. J., assignors to Radio Corporation of America, a corporation of Delaware Application October 31, 1945, Serial No. 625,890

2 Claims. (Cl. 250—7)

The present invention relates to signal transmission systems and more particularly, although not necessarily exclusively, to a guided-signal transmission system for television signals and the like.

In accordance with the present invention, there is provided an economical method and medium for transmitting one or several signals, such as television signals, to several receiving points or stations by means of modulated light, and also, a simple method is provided for separating such signals.

The primary object of the invention is to provide a signal transmission system for simultaneously transmitting a plurality of signals with minimum attenuation and substantially without distortion.

Another object resides in the provision of a novel arrangement for combining signals for transmission and for separating the signals at a receiving point or points.

A further object is to provide in a novel manner for selecting any one of a plurality of transmitted signals.

A still further object is to provide a novel means for producing and utilizing signal modulated light.

A still further object is to provide a novel transmitter or conductor of light flux or other radiant energy including means for combining and separating light fluxes or other radiant energy introduced from a plurality of sources.

Other objects and advantages of the present invention will, of course, become apparent and immediately suggest themselves to those skilled in the art to which the invention is directed from a reading of the following specification in connection with the accompanying drawing in which.

Figures 1, 2:
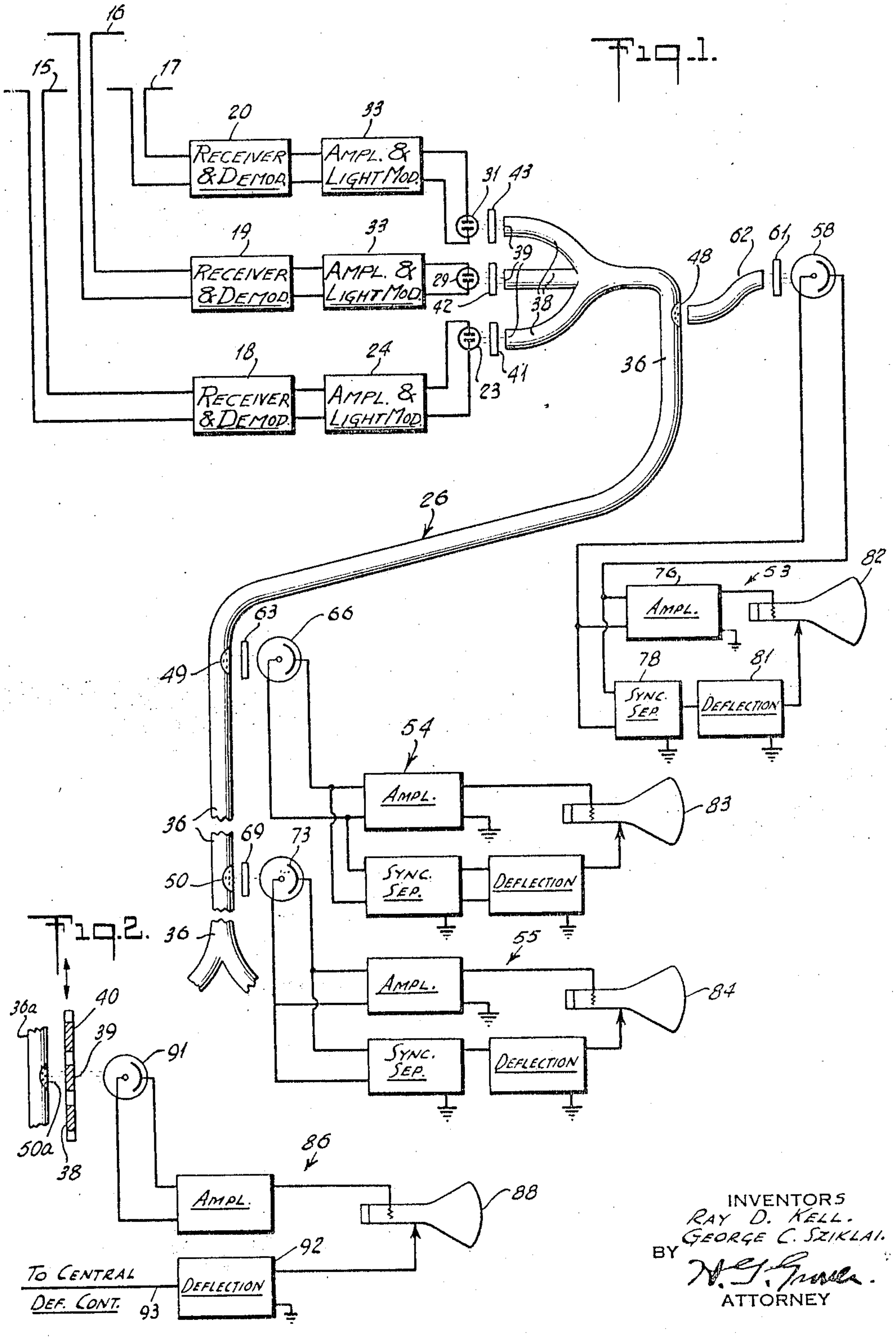
Fig. 1 shows, schematically, a guided transmission system for television signals in accordance with the invention.
Fig. 2 illustrates a modification of the system of Fig. 1.

Referring to Fig. 1, a three channel system for the distribution of television signals is shown. A television signal includes extremely high and extremely low frequency components as well as portions having steep wave fronts, and therefore, a television signal requires special transmission channels for transmission even over short distances. These special transmission channels ordinarily are not capable of carrying multiplexed signals except at great expense for additional equipment. The invention illustratively shown in Fig. 1 provides a simple and economical transmission channel which has, for all practical purposes, no effect on the transmitted signal frequencies. That is to say, there is absorption of the light flux or radiant energy carrier, but this absorption does not vary appreciably with the modulating frequency.

The television signals are received by UHF (ultra high frequency) radio transmission through antennas 15, 16, and 17, connected or coupled to television receivers 18, 19, and 20, respectively. Each antenna, being tuned to the signal to be received and having the proper directivity with respect to the modulated signal transmitting source, will provide an optimum signal. The receivers 18 to 20 may be of any type suitable for the purpose and may include the usual means for demodulating the UHF signal so as to obtain the video signal therefrom.

The video signal from each receiver, for example the video signal from receiver 18, is applied in any suitable manner to modulate a radiant energy source or a light source such, for example, as a glow tube 23. For example, the signal from the receiver 18 may be supplied to an amplifier 24 or other apparatus suitable for modulating the device, such as the lamp 23, which provides the modulated light flux or modulated radiant energy to be introduced into the light conducting means of the invention indicated generally by reference character 26. The glow lamps or other light or radiant energy sources 29 and 31, respectively, are connected to the receivers 19 and 20, respectively, through devices 33 which are or may be similar to the device 24.

Figure 5:
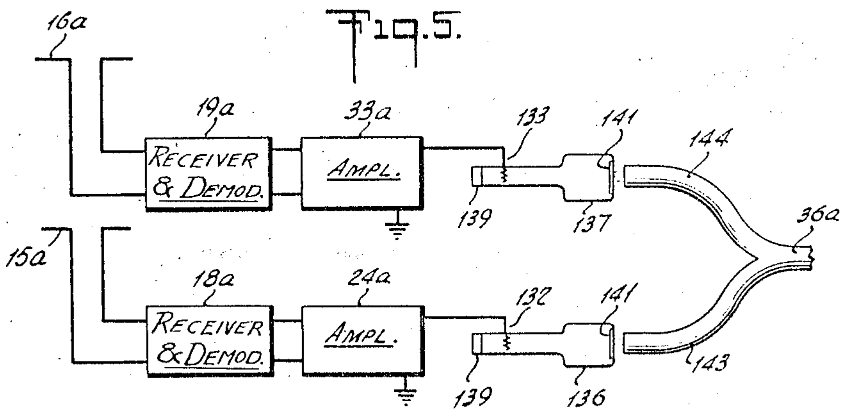
Fig. 5 shows a novel arrangement in accordance with the invention for obtaining signal modulated light flux.

Although glow lamps have been shown for the sake of convenience of illustration, it will be understood that each light source fed by the radio receivers may be a Kerr cell of the Karolus type, for instance, a cathode ray tube with a low persistence screen, or the like. An example of a Kerr cell of the Karolus type is shown in United States Patent No. 1,885,604, granted to A. Karolus November 1, 1932. Fig. 5, later to be described, is illustrative of the cathode ray activated type of light source.

The light conducting means 26, in accordance with the invention, may be in the form of a rod 36 of transparent or translucent plastic material such as acrylic or polystyrene resins, a rod of quartz, or a tube having a reflecting inner surface.

The rod 36 is branched as indicated at 38 to provide light receiving ends or windows 39. Between the modulated light sources and the windows 39 there are three different colored filters 41, 42, and 43, permitting only a distinct color response to enter the light guide or rod 36. While light and color have been referred to herein, it will be understood that radiation even in the invisible portion of the spectrum may be employed if desired.

Where the plastic rod is roughened in some manner, as by sanding, some of the guided light will escape, or in other words, the modulated light will appear at the surface. In front of this sanded surface or window, a sensitive photocell, for example, or other device responsive to light, will convert the light modulation to an electric current having the same modulation as that of the original signals. By placing a filter between the sanded surface and the photocell, any one of the signals may be selected. For example, in Fig. 1, sanded surfaces or windows are indicated at 48, 49, and 50. A plurality of receivers indicated generally by reference characters 53, 54, and 55, are shown, and any receiver may be made responsive to any one of the signals provided by the radio receivers 18 to 20, depending on the kind of light filter placed between the photocell and the window on the rod 36. For example, the photocell 58, associated wtih the receiver 53 may operate in accordance with signals from the radio receiver 18 if the filter 61 is similar to the filter 41. An additional light conducting rod may, if desired, be interposed between a window on the rol 36 and a photocell. A light filter may be positioned before the window in the main rod, or before the photocell. The latter arrangement is shown in Fig. 1 wherein a rod 62 serves as an auxiliary link. The filter 63, interposed between the window 49 and the photocell 66, may be similar to the filter 42, and filter 69, interposed between the window 50 and the photocell 73, may be similar to the filter 43. With the suggested arrangement substantially complete separation of the signals present in the modulated light flux is obtained.

The receivers 53 to 55 are or may be similar and may be constructed and operated in known manner. A description of the receiver 53 will suffice for all three.

The signal current in the output of the photocell 58 has the same modulation as the carrier signal received by the receiver 18 with the aid of the antenna 15. That is to say, the demodulated signal from the amplifier and modulator 24 which actuates the glow tube 23 is the same as the electrical signal appearing in the output of the photocell 58. This signal may, as stated above, include the video signal accompanied by the sync signals and is applied to a video amplifier 76 and a sync signal separator 78. Signal separation is accomplished in the sync signal separator 78, and control signals are supplied from this separator to a deflection generator 81. An example of a sync signal separator is shown in United States Patent to Bedford, No. 2,207,775, granted July 16, 1940. Horizontal and vertical sweep frequencies of appropriate waveform are applied to the deflection system of an image producing device, such as a fluorescent screen or target cathode ray tube 82. The video signals are supplied to the tube 82 from the output circuit of the previously mentioned video amplifier 76. Similarly, images appropriate to the signal selection of the filters 63 and 69 are produced by the cathode ray tubes 83 and 84. In the example shown, tubes 83 and 84 will exhibit images corresponding to signals from radio receivers 19 and 20. The manner in which this is accomplished in accordance with the invention will, it is believed, be obvious in view of the foregoing.

Fig. 2 of the drawings illustrates a modification of the system of Fig. 1 in which a receiver designated 86 may be used for producing images on its associated cathode ray tube 88 so that an image represented by signals received by any one of the radio receivers may be reproduced. A section of a signal guiding means, such as 26 in Fig. 1, is designated 36*a*, and a series of filter sections 38, 39, and 40 are retained in any suitable manner so that any one of these filter sections may be selected to be interposed between the window 50*a* and a photocell 91. As a further modification of the system of Fig. 1, the ray deflecting means for the tube 88 may be produced by a deflection generator 92 operating under control of a separate source of deflection control signals furnished over a connection 93.

Figure 3:
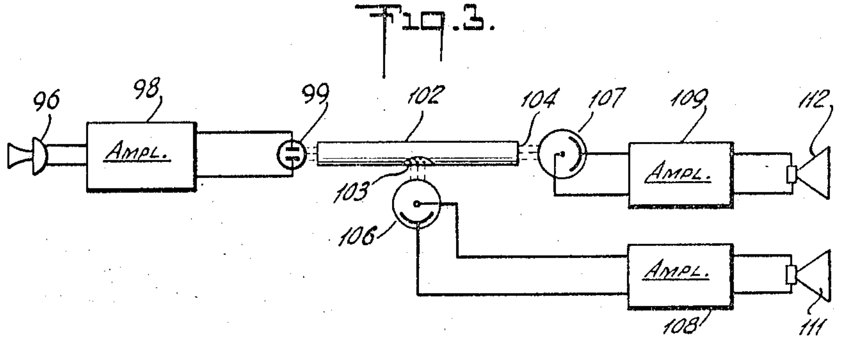
Fig. 3 shows the transmission system of the invention applied to the transmission of sound modulated signals.

Fig. 3 of the drawings illustrates an arrangement whereby the method of communication of the invention may be used for distribution of sound or other intelligence. A signal generator, such as a microphone 96 and an amplifier 98, or any other signal source, modulates the light output of a light source such as a glow tube 99. Other light sources mentioned herein may also be used for the purpose. The light from the light source 99 is directed into a guiding rod 102 which is provided with windows 103 and 104. The window 103 may be provided in the manner previously described. Photocells 106 and 107 convert the light modulation into an electric signal which is amplified by the amplifiers 108 and 109 and reproduced by transducers 111 and 112. These transducers may be loudspeakers, phones, etc.

Figure 4:
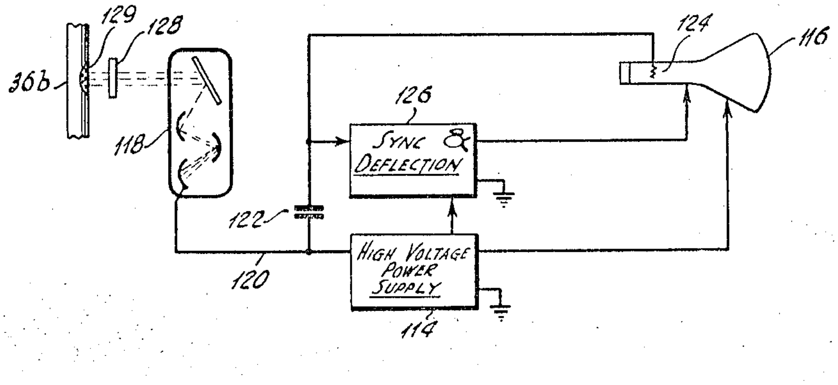
Fig. 4 illustrates a further modification of the system of Fig. 1.

Fig. 4 of the drawings illustrates the use of an electron multiplier photocell which may be used to advantage. A high potential power supply 114 is usually present since it is needed for operation of certain types of cathode ray reproducing tubes. Where the tube 116 is of this type high voltage from the power supply is therefore readily available for operation of an electron multiplier photocell 118 shown conventionally. The photocell may be similar to that disclosed in U. S. Patent No. 2,219,871, granted October 29, 1940, to Louis Malter. High voltage is applied to the collector electrode of the photocell over a connection 120, and signals amplified by the multiplier action of the photocell are transferred by a condenser 122 to the control electrode 124 of the cathode ray tube 116. The signals are also applied to a sync signal separator and deflection control unit 126 of any well known form. A portion of a light guiding or conducting means is designated 36*b*, and an appropriate filter 128 is interposed between a window 129 on the light guide 36*b* and the light sensitive section of the photocell 118.

Fig. 5 of the drawings shows illustratively an arrangement employing a beam modulated cathode ray tube as a light source. Different colored phosphors may be used, and the filters may be eliminated. For example, phosphors of zinc oxide family generally have a fraction of a microsecond delay time and may be used advantageously.

In Fig. 5, 18*a* and 19*a* are radio receivers fed from antennas 15*a* and 16*a*, respectively. Amplifiers and demodulators 24*a* and 33*a* supply amplified and demodulated signals to the control grids 132 and 133 of cathode ray tubes 136 and 137. Each of the tubes 133 and 136 is provided with an electron gun arrangement 139, and the beam produced by this gun is modulated by the control grid of the tube. The target area 141 of each tube may be coated with an appropriate phosphor, and the light produced by bombardment is picked up by the branches 143 and 144 of a light guiding rod 36*a*. The cathode ray beam in each of the tubes 136 and 137 need not be sharply focused, thereby making it possible to obtain a sufficient quantity of light flux without damage to the fluorescent material.

Having now described the invention, what is claimed and desired to be secured by Letters Patent is the following:

1. A signal transmission system comprising a light guide of light transmitting material, a plurality of means for producing signal modulated light for transmission through said light guide, each of said means producing light of a different color, a plurality of windows in said light guide each window designed to emit at least a portion of the total signal modulated light being transmitted, a plurality of photocells, each cell being positioned to receive light directed from one of said windows, means interposed between each window and its associated photocell to serve as a color filter, a signal translating device for each photocell, and signal amplifying means interconnecting each photocell with its associated signal translating means.

2. A signal transmission system comprising a light guide of light transmitting material, a plurality of means for producing signal modulated light for transmission through said light guide, a plurality of light filter means one associated with each source of signal modulated light whereby to admit light of a single color to said light guide, a plurality of windows in said light guide, each window designed to emit at least a portion of the total signal modulated light being transmitted, a plurality of photocells, each cell being positioned to receive light directed from one of said windows, means interposed between each window and its associated photocell to serve as a color filter, a signal translating device for each photocell, and signal amplifying means interconnecting each photocell with its associated signal translating means.

RAY D. KELL.
GEORGE C. SZIKLAI.

REFERENCES CITED

The following references are of record in the file of this patent:

UNITED STATES PATENTS

| Number | Name | Date |
|---|---|---|
| 1,919,888 | Hough | July 25, 1933 |
| 1,981,999 | French | Nov. 27, 1934 |
| 2,070,418 | Beverage | Feb. 9, 1937 |
| 2,071,284 | Hyland | Feb. 16, 1937 |
| 2,100,348 | Nicolson | Nov. 30, 1937 |
| 2,187,908 | McCreary | Jan. 23, 1940 |